(12) United States Patent
Kizaki et al.

(10) Patent No.: US 7,882,728 B2
(45) Date of Patent: Feb. 8, 2011

(54) DUAL ANOMALY JUDGMENT DEVICE FOR A FUEL CELL

(75) Inventors: Mikio Kizaki, Toyoake (JP); Osamu Yumita, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 499 days.

(21) Appl. No.: 11/920,350

(22) PCT Filed: Jun. 6, 2006

(86) PCT No.: PCT/JP2006/311688

§ 371 (c)(1),
(2), (4) Date: Nov. 14, 2007

(87) PCT Pub. No.: WO2006/132393

PCT Pub. Date: Dec. 14, 2006

(65) Prior Publication Data

US 2009/0064764 A1    Mar. 12, 2009

(30) Foreign Application Priority Data

Jun. 6, 2005    (JP) .............................. 2005-166193

(51) Int. Cl.
*G01M 3/26*    (2006.01)
(52) U.S. Cl. ...................... 73/40.5 R; 73/49.4; 73/49.7
(58) Field of Classification Search .............. 73/40.5 R, 73/40.7, 46, 49.4, 49.7, 49.8
See application file for complete search history.

(56) References Cited

U.S. PATENT DOCUMENTS

| | | | | |
|---|---|---|---|---|
| 6,638,650 | B1 * | 10/2003 | Bailey et al. .................. | 429/13 |
| 6,815,107 | B2 * | 11/2004 | Inai et al. ...................... | 429/22 |
| 7,087,334 | B2 * | 8/2006 | Sugino et al. ................. | 429/25 |
| 7,127,937 | B1 * | 10/2006 | Thyroff .................... | 73/40.5 R |
| 7,276,310 | B2 * | 10/2007 | Kobayashi et al. ............ | 429/35 |
| 7,316,242 | B2 * | 1/2008 | Porter et al. ................. | 137/255 |
| 7,442,452 | B2 * | 10/2008 | Miura .......................... | 429/13 |
| 7,581,431 | B2 * | 9/2009 | Yoshida ................... | 73/40.5 R |
| 2003/0008185 | A1 * | 1/2003 | Sugino et al. ................. | 429/13 |
| 2003/0211376 | A1 * | 11/2003 | Hatoh et al. .................. | 429/32 |
| 2004/0081864 | A1 * | 4/2004 | Herrmann ..................... | 429/13 |
| 2004/0154380 | A1 * | 8/2004 | Walker .................... | 73/40.5 R |
| 2005/0120777 | A1 * | 6/2005 | Cryer et al. .................... | 73/40 |
| 2006/0035118 | A1 * | 2/2006 | Coerlin et al. ................ | 429/13 |

(Continued)

FOREIGN PATENT DOCUMENTS

DE    100 36 572 A1    2/2002

(Continued)

*Primary Examiner*—David A. Rogers
(74) *Attorney, Agent, or Firm*—Kenyon & Kenyon LLP

(57) ABSTRACT

There is provided an anomaly judgment device that is capable of detecting an abnormal state of a system highly accurately and obtaining an accurate result. The anomaly judgment device may include a plurality of anomaly judgment devices for judging an anomaly of the system and, in cases where it is judged by the plurality of anomaly judgment devices that there is an anomaly, a judgment device judges that a system anomaly exists. Hence, even in the event of a localized abnormal state judgment by one anomaly judgment device or failure, a final judgment is not made based on that anomaly alone, and at least one other anomaly judgment is made, whereby erroneous judgments can be eliminated and a highly accurate anomaly judgment is possible.

6 Claims, 8 Drawing Sheets

U.S. PATENT DOCUMENTS

| | | | |
|---|---|---|---|
| 2006/0107731 A1* | 5/2006 | Thomas | 73/49.2 |
| 2006/0114113 A1* | 6/2006 | Yokosawa et al. | 340/632 |
| 2006/0166060 A1* | 7/2006 | Miura | 429/25 |

FOREIGN PATENT DOCUMENTS

| | | |
|---|---|---|
| DE | 101 64 450 A1 | 10/2003 |
| JP | 3-254070 A | 11/1991 |
| JP | 09-022711 A | 1/1997 |
| JP | 09022711 A * | 1/1997 |
| JP | 2003-149071 A | 5/2003 |
| JP | 2003-308866 A | 10/2003 |
| JP | 2004127748 A * | 4/2004 |
| JP | 2004-139842 A | 5/2004 |
| JP | 2004-152729 A | 5/2004 |
| JP | 2004-179003 A | 6/2004 |
| JP | 2004-213944 A | 7/2004 |
| JP | 2004-349010 A | 12/2004 |
| JP | 2005-124358 A | 5/2005 |
| JP | 2005-235453 A | 9/2005 |
| JP | 2006-40618 A | 2/2006 |
| WO | WO 99/64938 A1 | 12/1999 |

* cited by examiner

DUAL ANOMALY JUDGMENT DEVICE FOR A FUEL CELL

This is a 371 national phase application of PCT/JP2006/311688 filed 06 Jun. 2006, claiming priority to Japanese Patent Application No. 2005-166193 filed 06 Jun. 2005, the contents of which are incorporated herein by reference.

BACKGROUND OF THE INVENTION

1. Field of the Invention

The present invention relates to an anomaly judgment device of a fuel cell system or the like and, more particularly, to a technology for improving the judgment accuracy.

2. Description of Related Art

Because a fuel cell system uses fuel gas, many means for judging system anomalies have been provided. For example, Japanese Patent Application Laid-Open No. 2004-139842 discloses a hydrogen leak sensing system that is constituted to sense a hydrogen leak by means of a hydrogen leak sensor in cases where the vehicle speed is less than a predetermined value and to sense a hydrogen leak based on the correlation between a power generating current theoretical value for the fuel cell which is calculated in accordance with quantity of hydrogen supplied to the fuel cell and the actual power generating current value of the fuel cell in cases where the vehicle speed is equal to or more than a predetermined value. Furthermore, Japanese Patent Application Laid-Open No. 2003-308866 discloses a gas leak sensing device that is constituted to detect the enclosed region internal pressure of a fuel gas circulatory supply system by means of a pressure gauge and which, in cases where the detection result of the pressure gauge indicates a drop in pressure at a speed equal to or more than a given reference, judges that a fuel gas leak has been produced.

All the prior art involves devices that compare a measured value from some kind of detection device with a comparison value and ultimately judge a hydrogen leak in accordance with the comparison result.

SUMMARY OF THE INVENTION

However, malfunctions or failure of the detection device itself for grasping the state of a fuel cell system are naturally to be expected. In addition, the accuracy of the detection device is varied and judgment based on one detection principle and detection procedure is not necessarily perfect and includes the possibility of erroneous detection to a certain degree. For example, there are cases where, because the density of localized hydrogen gas that exists in the sensor is detected even when the hydrogen gas sensor itself is normal, it cannot be said that this correctly indicates a hydrogen gas leak state for the whole system. In addition, in cases where a gas leak is judged as a result of a drop in pressure in the piping, there exists the possibility of an erroneous judgment in cases where the sensor pressure fluctuates on account of some kind of external disturbance.

In addition, there exists the possibility that an abnormal system state will be measured as a result of a malfunction of a part that affects the system state even when the detection device is operating normally. For example, there is the possibility of a defect in the opening of the fuel shutoff valve, a defect in the manual valve, and a clogging up of the filter and piping or the like.

Therefore, an object of the present invention is to provide an anomaly judgment device that is able to accurately detect an abnormal state in the system and obtain an accurate result.

In order to achieve the above object, the present invention comprises a plurality of anomaly judgment means for judging an anomaly of a system, wherein a system anomaly is judged in cases where an anomaly is judged by a plurality of anomaly judgment means.

According to the above constitution, a plurality of anomaly judgment means are provided and a system anomaly is first judged by judging an anomaly by means of not only one but a plurality of anomaly judgment means. For this reason, even in the event of a localized abnormal state judgment by one anomaly judgment means or failure, a final judgment is not made based on that anomaly alone and, because at least one other anomaly judgment is made, erroneous judgments can be eliminated and a highly accurate judgment is possible.

Here, a plurality of anomaly judgment means preferably have mutually different detection devices that detect the system state. In cases where an anomaly judgment is made based on the system state detected by a detection device, a system state of an abnormal level is sometimes detected as a result of the location of the detection device or the failure or malfunction thereof. Based on this fact, according to the present invention, even when a system anomaly is judged by one detection device, detection of the system state by another detection device is performed and, therefore, a highly accurate anomaly judgment can be made with a limited possibility of an erroneous judgment. Here, the plurality of detection devices may also operate based on the same detection principles. An example is a case where all the detection devices are pressure sensors that detect pressure. Further, a plurality of detection devices preferably operate based on mutually different detection principles. This is because, when the detection principles are the same, there is the possibility of a localized adverse effect as in a case where the detection device is positioned close to the point of detection but, if the detection principles of the detection devices are different, there is a high probability that the localized adverse effect acts only on one side. Such a case is a case where one of the detection devices is a gas density sensor while the remainder are pressure sensors, for example.

Here, the plurality of anomaly judgment means preferably have mutually different procedures for judging a system anomaly. This is because, in one case where the detection erroneously detects an anomaly even though the system is operating normally, it may be considered that a malfunction or defect has occurred with any of the constituent elements (parts) of the system but, if the judgment procedure differs as per the present invention, there is a high possibility of utilizing a different constituent element in the anomaly judgment and the effect of one constituent element on the anomaly judgment can be minimized.

Here, the present invention comprises a first detection device and a second detection device where the first detection device can be constituted comprising a detection section outside the fuel cell system and the second detection device can be constituted comprising a detection section inside a gas pipe of the fuel cell system. With this constitution, because the judgment is made by combining an anomaly judgment outside the system and an anomaly in the gas pipe inside the system, if an anomaly actually occurs, when the anomaly is detected both outside the system and inside the system, if an anomaly is judged in only either one, it can be assumed that the anomaly has been judged erroneously and has another cause. Hence, this disposition of the detection devices has no influence on a localized abnormal state and is advantageous for the sake of judging an anomaly correctly.

The present invention comprises first anomaly judgment means for judging an anomaly of the system; second anomaly judgment means for judging an anomaly of the system and which differs from the first anomaly judgment means at least with respect to a detection device or anomaly judgment procedure; and judgment means for implementing an anomaly judgment using the second anomaly judgment means in cases where it is judged by the first anomaly judgment means that there is an anomaly and for judging that a system anomaly exists in cases where it is also judged by the second anomaly judgment means that there is an anomaly.

According to the present invention, a system anomaly is first judged to exist after it is judged by the first and second anomaly judgment means that there is an anomaly. As a result, even when there is a localized abnormal state judgment or failure of either anomaly judgment means, a final judgment is not made based on this anomaly alone and a system anomaly is not judged to exist unless it is judged by means of another anomaly means that there is an anomaly. Hence, erroneous judgments are eliminated and a highly accurate anomaly judgment is possible. In particular, the first and second anomaly judgment means differ with respect to either the detection devices or judgment means. One detection device detects an abnormal state in its own location and failure or a malfunction occurs. In addition, one judgment procedure detects an abnormal state as a result of a malfunctioning or defect of the constituent elements of the system. However, according to the present invention, because another detection device or judgment procedure must be used in such a case, erroneous judgments can be kept to a minimum and a highly accurate anomaly judgment can be made.

For example, the present invention comprises, as the first anomaly judgment means, a) a detection device that detects a fuel gas density outside the fuel cell system; and b) a first judgment device that judges that there is an anomaly in cases where the fuel gas density detected by the detection device is equal to or more than a predetermined value, and comprising, as the second anomaly judgment means, c) sealing means for sealing the pressure of the fuel gas piping; and d) a second judgment device that judges that there is an anomaly in cases where the change in the pressure in the fuel gas piping sealed by the sealing means is equal to or more than a predetermined value, wherein the judgment means activates the second anomaly judgment means in cases where it is judged by the first judgment device that there is an anomaly.

With the above constitution, once the first anomaly judgment means has judged that there is an anomaly in a case where there is a high fuel gas density, the second anomaly judgment means is also activated and, in cases where the pressure difference in the sealed fuel gas piping is large, a system anomaly is first judged to exist. Therefore, in cases where a quite localized hydrogen gas accumulation, even when an anomaly is judged by the first anomaly judgment means, because a pressure drop anomaly in the fuel gas piping has not occurred, an erroneous judgment can be prevented. Further, in cases where a gas leak from the fuel gas piping actually occurs and an external fuel gas density anomaly has occurred, because an abnormal pressure drop in the fuel gas piping also occurs, a gas leak judgment is correctly made.

For example, the present invention comprises, as the first anomaly judgment means, e) sealing means for sealing the pressure of the fuel gas piping; f) a detection device that detects the pressure of the fuel gas piping sealed by the sealing means; and g) a first judgment device that judges that there is an anomaly in cases where the change in the pressure in the fuel gas piping sealed by the sealing means is equal to or more than a predetermined value, and comprises, as the second anomaly judgment means, h) power generation control means for changing the power generation state of the fuel cell system; and i) a second judgment device that judges that there is an anomaly in cases where the pressure of the fuel gas piping when a power generation amount is restricted by the power generation control means is equal to or less than a predetermined value, wherein the judgment means activates the second anomaly judgment means in cases where it is judged by the first judgment device that there is an anomaly.

According to the above constitution, once it is judged from the pressure drop in the fuel gas piping that there is an anomaly by the first anomaly judgment means, the second anomaly judged means are also activated and the pressure in a state where the power generation is restricted is monitored. If the pressure is abnormal, a system anomaly is first judged to exist. Hence, even when it is judged by the first abnormal judgment means that there is an anomaly as a result of pressure fluctuations that are normally produced in the fuel gas piping in the operation of the accessories of the fuel cell, as long as the cause of the pressure fluctuations is excluded by the second anomaly judgment means, the pressure is not in an abnormal state and an erroneous judgment can be prevented. In cases where a drop in pressure is observed as a result of a gas leak from the fuel gas piping, because this represents a state where the pressure in a state where the power generation amount is restricted has dropped abnormally, a system anomaly is correctly judged in this case.

Here, the anomaly judgment device means preferably further comprises means for raising the pressure of the fuel gas piping after it is judged by the first anomaly judgment means that there is an anomaly and prior to the anomaly judgment by the second anomaly judgment means. With a constitution of this kind, in cases where the pressure in the fuel gas piping during the first anomaly judgment is relatively low, the pressure is raised and then the second anomaly judgment is implemented and the pressure (change) state can be judged more clearly.

Here, the constituent elements of the system that pertain to the anomaly judgment are preferably caused to operate again after it is judged the first anomaly judgment means that there is an anomaly and before an anomaly judgment by the second anomaly judgment means. An erroneous judgment sometimes arises from a malfunctioning of the constituent elements of the system and the operating state of these constituent elements is sometimes restored to normal when individual constituent elements are caused to operate again, that is, subjected to a refresh operation. According to this constitution, in cases where an anomaly is judged once, constituent elements pertaining to the anomaly judgment are refreshed and, therefore, the operation is restored to normal in the second anomaly judgment and an erroneous judgment in which a system anomaly is judged to exist can be prevented. Operating again (refresh operation) means, for example, in a case where the constituent elements are valves, that the valves are shaken to open and close them.

Here, in cases where it is judged by the second anomaly judgment means that there is an anomaly, the judgment means preferably stop the fuel cell system. This is because the probability of a system anomaly if an anomaly is judged by the second anomaly judgment means is very high and it is therefore appropriate to stop the system.

DETAILED DESCRIPTION OF PREFERRED EMBODIMENT

Preferred embodiments of the present invention will be described based on the drawings. The following embodiments serve to illustrate the present invention and the present invention can be implemented with a variety of modifications without being limited to the following embodiments.

Description Of The Principles Behind The Present Invention

The principles of the present invention will now be described with reference to the system block diagram of FIG. 1 and the flowchart of FIG. 2.

Figure 1:
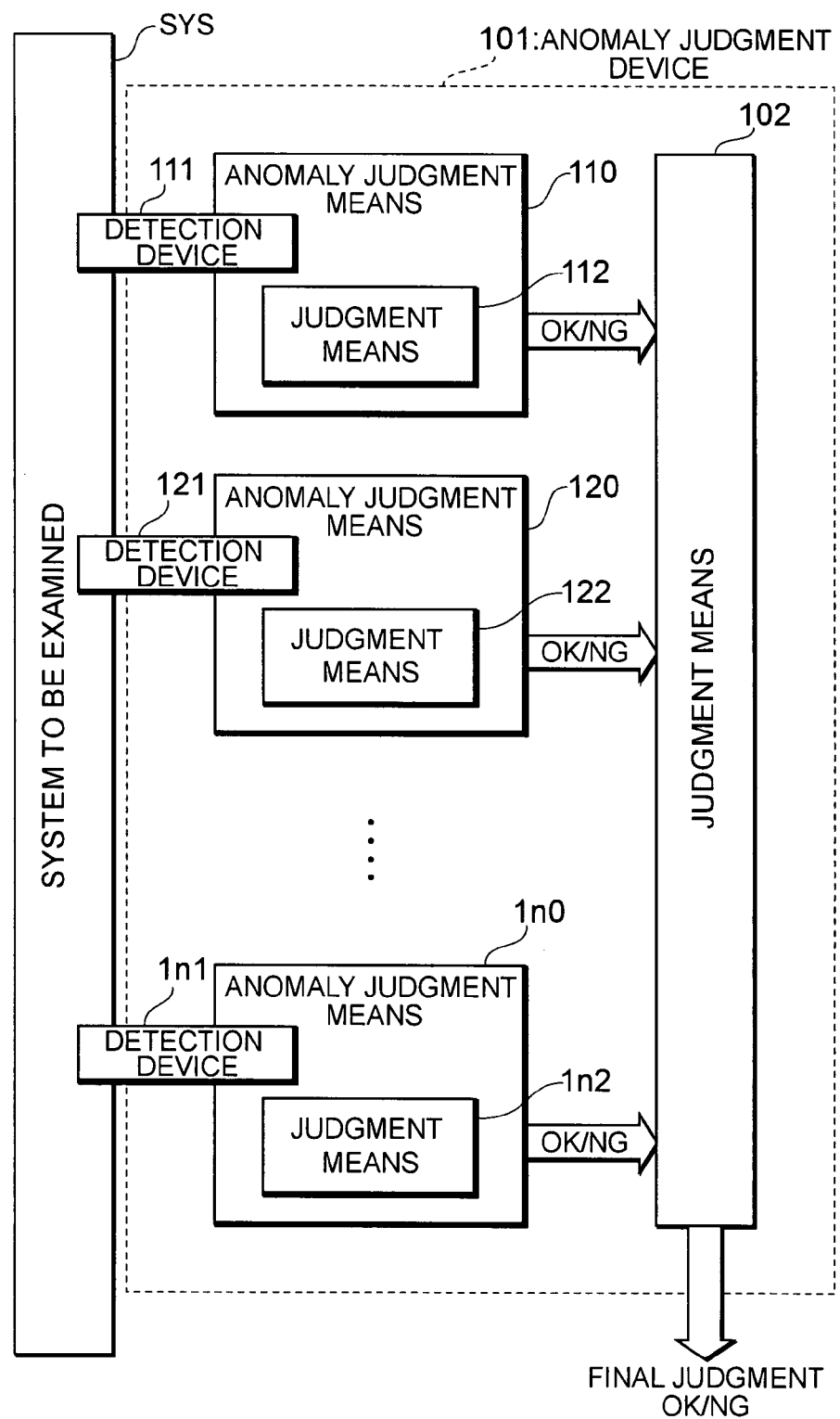
FIG. 1 is a block diagram showing the principles behind the anomaly judgment device of the present invention.

As shown in FIG. 1, the anomaly judgment device 101 of the present invention comprises a plurality of anomaly judgment means 110, 120, . . . , 1n0 (where n is a natural number) and is constituted to judge a system anomaly in cases where an anomaly is judged by the plurality of anomaly judgment means.

The respective anomaly judgment means 110, 120, . . . , n0 each comprise a detection device 111, 121, . . . , 1n1 respectively and detect the system state of a system to be examined SYS. The respective anomaly judgment means 110, 120, . . . , 1n0 are constituted to judge whether the detected system state is abnormal by means of independent judgment procedures 112, 122, . . . , 1n2 respectively and output the conclusion of the anomaly judgment means, namely that the system state is normal (OK) or abnormal (NG). Judgment means 102 is constituted to input the judgment results from the plurality of anomaly judgment means 110, 120, . . . , 1n0 and, in cases where it is judged by any of the plurality of anomaly judgment means that an anomaly exists, output a system anomaly (NG) or, otherwise, output normal (OK) as the final judgment.

These detection devices 111, 121, . . . , 1n1 are preferably different. The respective detection devices more preferably have different detection principles. For example, the detection of gas density and the detection of gas pressure have different detection principles. The constitution may also be such that the detected physical values differ. When the same detection principles are employed between a plurality of detection devices, there is the possibility that the effect of one primary factor that acts on one detection device will also act on the other detection devices. This is because, if the detection principles of the detection devices differ, there is a high probability that principles acting on only one detection device will not act on detection devices based on other detection principles. An example is a case where one of the detection devices is a gas density sensor and the remainder are pressure sensors.

In addition, while the detection principles may be the same between a plurality of detection devices (in the cases of the same density sensors, for example), the location (installation positions) of the detection devices may also differ. This is because, if the locations of the detection devices differ, an anomaly with a localized state value in a certain location does not affect the plurality of detection devices.

Further, the detection principles may be the same between a plurality of detection devices and there may be a plurality of detection devices with the same installation position. This is because the possibility of the failure or malfunction that occurs in one detection device simultaneously occurring in another detection device is extremely small.

In addition, the judgment means 112, 122, . . . , 1n2 of the respective anomaly judgment means preferably have mutually different judgment procedures. In one judgment procedure, an anomaly judgment is implemented by using any constituent element (part) of a system to be examined SYS or receiving an effect but one of the causes for an anomaly being judged is sometimes the occurrence of a malfunction or defect in these constituent elements. If the judgment means are different from each other, different constituent elements are utilized for an anomaly judgment and the possibility of being receiving the effects of different constituent elements is then high. Therefore, a specified constituent element has a small effect on the anomaly judgment and, hence, the effect in a case where there is a problem with the specified constituent element can be reduced.

Figure 2:
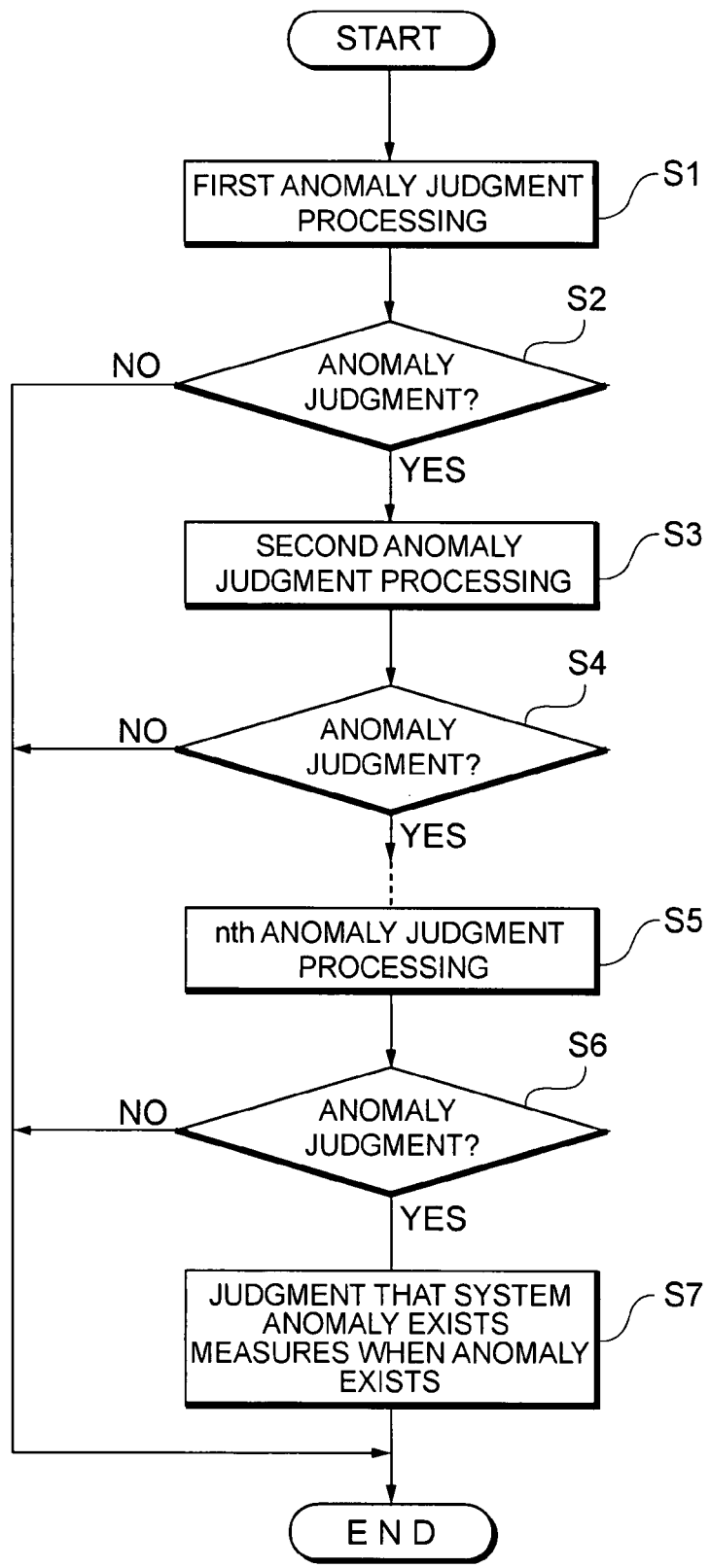
FIG. 2 is a flowchart showing the principles of the anomaly judgment method of the present invention.

FIG. 2 shows a flowchart for a case where anomaly judgments are executed in order.

As shown in FIG. 2, in a case where the present invention is implemented, first anomaly judgment processing is first carried out by anomaly judgment means 110 (S1). The system state of the system to be examined SYS is read by the detection device 111 and it is judged that the system state is abnormal or normal in accordance with the judgment procedure 112. If, as a result, it is judged that the system state is normal (S2: NO), the subsequent processing is omitted; however, if it is judged that the result of the judgment processing is abnormal (S2: YES), next second anomaly judgment processing is activated.

The second anomaly judgment processing is carried out by anomaly judgment means 120 which differ from the anomaly judgment means 110 (S3). As per the first anomaly judgment processing, the system state of the system to be examined SYS is read by the detection device 121. The detection device 121 differs from the detection device 111 in its detection principle and/or installation position. The system state thus read is then judged to be abnormal or normal in accordance with the judgment procedure 122. This judgment procedure 122 differs from the judgment procedure 112 and involves making judgment by causing co-operation between different constituent elements. If, as a result, it is judged that the system state is normal (S4: NO), the subsequent processing is omitted. However, if it is judged that the result of the judgment processing is abnormal (S4: YES), the third or subsequent anomaly judgment processing is also activated.

Anomaly judgment processing up to a maximum of nth anomaly judgment processing (S5) is possible and the system state of the system to be examined SYS is read by detection device 1n1 of the anomaly judgment means 1n0 according to the nth anomaly judgment processing and the system state is judged as being abnormal or normal in accordance with the judgment procedure 1n2. If, as a result, the system state is judged to be normal (S6: NO), it is ultimately judged that the system state is normal but, if the result of the judgment processing is judged to be different (S6: YES), it is first judged here that the system state is abnormal and special measures corresponding with the anomaly are taken (S7).

As mentioned earlier, the anomaly judgment device 101 is able to establish a system anomaly in cases where the judgment results from two or more or all of the plurality of anomaly judgment means 110, 120, . . . , 1n0 is abnormal. The usage of any number of anomaly judgment means can be determined by means of a good balance between the accuracy found in the system to be examined SYS and the time permitted for the examination. Practically speaking, in the majority of cases, two anomaly judgment means are sufficient because a system anomaly is established in cases where both anomaly judgment means judge that an anomaly exists.

In cases where two anomaly judgment processing is used, suppose that the two anomaly judgment means are first anomaly judgment means 110 and second anomaly judgment means 120. In cases where an abnormal state is judged by the first anomaly judgment means 110, the judgment means 102 carries out an anomaly judgment by means of the second anomaly judgment means 120 and, in cases where an abnormal state is also judged by the second anomaly judgment means 120, a system anomaly is judged to exist.

Thus, according to the present invention, a final judgment is not taken based only on a localized abnormal state judgment for either of the anomaly judgment means or failure thereof. Rather, a system anomaly is not established unless an anomaly is judged by another anomaly judgment means. Hence, a highly accurate anomaly judgment free of erroneous judgments is possible.

In cases where either of the detection devices 111 and 121 or judgment procedures 112 and 122 are made different for the first anomaly judgment means 110 and second anomaly judgment means 120, for example, even if an abnormal state is detected with respect to the location of one detection device or same fails or malfunctions and even if, in one judgment procedure, an abnormal state is detected as a result of a malfunction or defect in a constituent element of the system, because another detection device and judgment procedure must be used, erroneous judgments can be minimized as far as possible. The embodiments below exemplify a part of the combination of the present invention that is based on such principles.

First Embodiment

The first embodiment of the present invention relates to a fuel cell system 200 that is mounted in an automobile which is a moving body and relates to a system that is constituted to be capable of using hydrogen gas (fuel gas; boil-off gas) that is generated from liquid hydrogen as liquid fuel and from liquid hydrogen as gaseous fuel. The first embodiment is a constitutional example of an anomaly judgment device that, in particular, performs first anomaly judgment processing based on the detection accuracy of the hydrogen gas and performs second anomaly judgment processing based on the detection pressure of the fuel gas piping.

FIG. 1 shows a system block diagram of a fuel cell system 200 that comprises the anomaly judgment device of the present invention.

As shown in FIG. 1, the fuel cell system 200 comprises, in a fuel cell 100, a hydrogen gas supply system 1 that supplies hydrogen gas, an air supply system 2 that supplies air which is oxygen gas, a control section 3 that controls the fuel cell system 200, and a power system 4 that charges and discharges power that is generated by the fuel cell 100.

The hydrogen gas supply system 1 is constituted comprising fuel charging piping 10, fuel tanks 11 to 14, tank connecting piping 15, fuel gas piping 16, a gas-liquid separator 17, and a circulatory pump 18. In FIG. 1, a relief valve for reducing the internal pressure in cases where the internal pressure has risen to a fixed value, a backflow prevention valve that prevents a backflow of hydrogen gas, a manual valve that is opened and closed manually for adjustment, and a filter that filters impurities and so forth are not illustrated or labeled.

The fuel tanks 11 to 14 comprise a vacuum dual structure and are capable of storing liquid hydrogen with a very low boiling point (approximately 20K) and possess a pressure-resistant structure that allows hydrogen gas that is produced from the liquid hydrogen (boil-off gas) to be stored up to a high pressure of a certain magnitude. The respective fuel tanks 11 to 14 are provided with temperature sensors t1 to t4 for measuring the temperature of the internal hydrogen gas. The fuel charging piping 10 is high-pressure piping that links the fuel charging inlet F1 and each of the fuel tanks 11 to 14 in parallel. The respective fuel tanks comprise a filter, a manual valve, and a plurality of backflow prevention valves and are able to filter the liquid fuel supplied and prevent a backflow thereof.

Hydrogen gas is supplied in parallel from the respective tanks 11 to 14 to the fuel gas piping 15 via a filter, shutoff valves G1 to G4, a manual valve, and regulator valves R1 to R4. As a result of the filter, impurities inside the tank are filtered. The shutoff valves G1 to G4 are constituted to allow opening and closing control by means of the control section 3 and so that the internal hydrogen gas is supplied when the valves are open. The regulator valves R1 to R4 are constituted to supply hydrogen gas by depressurizing a high-pressure primary-side hydrogen gas to a fixed secondary-side pressure (intermediate pressure). The pressure sensors p1 to p4 are provided on the primary side of the regulator valves and are able to measure the supply pressure of the hydrogen gas and, in cases where the shutoff valves G1 to G4 which are the main stop valves are open, measure the internal pressure of the fuel tank.

The fuel gas piping 15 is linked to the fuel gas piping 16 by integrally collecting together the hydrogen gas from the respective fuel tanks 11 to 14. The pressure sensor p10 is then able to detect the internal pressure of the fuel gas piping 15 that has been collected together. The fuel gas piping 16 is provided with, in order starting from upstream, a regulator valve R10, a manual valve, a regulator valve R11, and a shutoff valve L1. The regulator valve R10 outputs the intermediate pressure of the fuel gas piping 15 after further reducing the pressure thereof to a secondary-side pressure. The pressure sensor 10 then detects the secondary-side pressure of the regulator valve R10 via a manual valve. The regulator valve R11 then depressurizes the hydrogen gas to a level where same can be supplied to the fuel cell before outputting the hydrogen gas. The control valve L1 can be controlled by the control section 3 and, when open, hydrogen gas is supplied to the fuel cell 100 to effect power generation and, when closed, the supply of hydrogen gas to the fuel cell 100 is stopped along with the power generation. The fuel gas piping 16 comprises pressure sensors p11 and p12. Pressure sensor p11 detects the internal pressure of the segment between the regulator valves R10 to R11 in the fuel gas piping 16 and the pressure sensor p12 detects the pressure of the section from the regulator valve R11 to the fuel cell 100.

Further, the regulator valves R10 and R11 overlap to cope with seal defects and both regulators are provided with a relief valve on the secondary side for a pressure reduction in cases where the pressure within the piping has reached a predetermined pressure or more.

The fuel cell 100 comprises a stacked structure rendered by stacking a plurality of power generating structural bodies called single cells. The respective single cells have a structure obtained by sandwiching a power generating body called an MEA (Membrane Electrode Assembly) between separator pairs provided with hydrogen gas, air and coolant flow paths.

An MEA is constituted by sandwiching a polymer electrolyte film between two electrodes, namely an anode and a cathode. The anode has an anode catalytic layer provided on a porous support layer and the cathode has a cathode catalytic layer provided on a porous support layer.

The hydrogen gas supplied to the anode of the fuel cell 100 is supplied to the respective single cells via a manifold and flows through the hydrogen gas flow path of the separators, thereby producing an electrochemical reaction at the MEA anode. The hydrogen offgas discharged from the fuel cell 100 is supplied to the gas-liquid separator 17. The gas-liquid separator 17 removes moisture and other impurities produced as a result of the electrochemical reaction of the fuel cell 100 during a normal operation from the hydrogen offgas and releases same to the outside via a shutoff valve L2. The circulatory pump 18 constitutes a circulatory route by way of the forced circulation of hydrogen offgas and by returning same to the fuel gas piping 16. A purge shutoff valve L3 is open during purging but is shut off in a normal running state and when a gas leak in the piping is judged. The hydrogen offgas that is purged from the purge shutoff valve L3 is processed by an exhaust system comprising a dilution device 25.

The air supply system 2 comprises an air cleaner 21, a compressor 22, a humidifier 23, a gas-liquid separator 24, a dilution device 25, and a silencer 26. The air cleaner 21 cleans the air and feeds same back to the fuel cell system 200. The compressor 22 compresses the air taken in accordance with control by the control section 3 in order to modify the volume of air and the air pressure. The air that is supplied to the cathode of the fuel cell 100 is supplied to the respective single cells via a manifold in the same way as the hydrogen offgas and flows through the air flow path of the separator, thereby producing an electrochemical reaction at the cathode of the MEA. The humidifier 23 adds an optimum level of humidity to the compressed air by exchanging the air offgas exhausted from the fuel cell 100 for moisture. The air that is supplied to the fuel cell 100 is supplied to the respective single cells via the manifold and flows through the air flow path of the separator, thereby producing an electrochemical reaction at the cathode of the MEA. The air offgas exhausted from the fuel cell 100 has excess moisture removed in the gas-liquid separator 24. The dilution device 25 is constituted to mix and dilute the hydrogen offgas supplied from the purge shutoff valve L3 with the air offgas and homogenize the mixture until a density at which an oxygen reaction cannot occur is established. The silencer 26 is constituted to allow the sound level of the mixed exhaust gas to be reduced before discharge.

The power system 4 comprises a DC-DC converter 40, a battery 41, a traction inverter 42, a traction motor 43, an auxiliary inverter 44, and a high-voltage accessory 45 and so forth. The fuel cell 100 is constituted with signal cells connected in series and produces a predetermined high-pressure voltage (approximately 500V, for example) between the anode A and cathode C. The DC-DC converter 40 performs two-way voltage conversion with the battery 41 which has a terminal voltage that differs from the output voltage of the fuel cell 100, and is able to utilize the power of the battery 41 as an auxiliary power source of the fuel cell 100 or charge the battery 41 with surplus power from the fuel cell 100. The DC-DC converter 40 is able to set the voltage across the terminals corresponding to the control of the power source control section 5. The battery 41 has stacked battery cells so that the terminal voltage is a fixed high voltage and can be charged with surplus power by means of control by a battery computer (not shown) and supply auxiliary power. The traction inverter 42 converts a DC current to a three-phase AC current and supply the three-phase AC current to the traction motor 43. The traction motor 43 is a three-phase motor, for example, which is the main motive power source of the automobile in which the fuel cell system 200 is installed. The auxiliary inverter 44 is DC to AC conversion means for driving the high-voltage accessory 45. The high-voltage accessory 45 is any type of motor required to run the fuel cell system 200 such as the compressor 22, circulatory pump 18 and cooling system motor.

The control section 3 comprises, in a general computer constitution, a RAM, ROM and interface circuit and so forth. In addition to controlling the whole of the fuel cell system 200 that mainly comprises a hydrogen gas supply system 1, an air supply system 2, and a power system 4 by sequentially executing a software program that is stored in an internal ROM or the like, the control section 3 allows the fuel cell system 200 to operate as the anomaly judgment device of the present invention.

A hydrogen sensor HD is a detection device that is constituted so as to be capable of detecting the density of hydrogen gas and is provided downstream in the direction of travel from the exhaust gas vent, for example, at the back of the automobile. The hydrogen sensor HD may also be provided at a few points in which the hydrogen gas leak occurs. In cases where another hydrogen sensor is provided, same is provided in the compartment that houses the fuel cell, for example. The detection signal Sd of the hydrogen sensor HD is input to the control section 3 so that same can be read and in order to obtain the hydrogen gas density. Further, in addition to being capable of detecting the density of hydrogen gas at a predetermined resolution, the hydrogen sensor HD may also simply detect whether or not there is hydrogen gas at or higher than a fixed density (whether such hydrogen gas exists).

Thereafter, the anomaly judgment method of the first embodiment will be described with reference to the flowchart in FIG. 4. This flowchart is implemented at fixed intervals during the operation of the fuel cell system 200.

The anomaly judgment device of the first embodiment executes first anomaly judgment processing (means and device) (S100 to S102) which detects the hydrogen gas density by means of the hydrogen sensor HD and, in cases where the fuel gas density detected by the hydrogen sensor HD is equal to or more than a predetermined value, judges that there is an anomaly, second anomaly judgment processing (means and device) (S105 to S110) that seals the pressure of the fuel gas piping 16 by means of the shutoff valves G1 to G4 and L1 and, in cases where the pressure change in the sealed fuel gas piping is equal to or more than a predetermined value, judges that an anomaly exists and judgment processing (means and device) (S111) which, in cases where it is also judged in the second anomaly judgment processing that an anomaly exists, performs processing for a system anomaly.

Furthermore, the procedure also comprises processing to raise the pressure of the fuel gas piping prior to the anomaly judgment by the second anomaly judgment means after an anomaly has been judged by the first anomaly judgment (S104). This will be described specifically hereinbelow.

Figure 4:
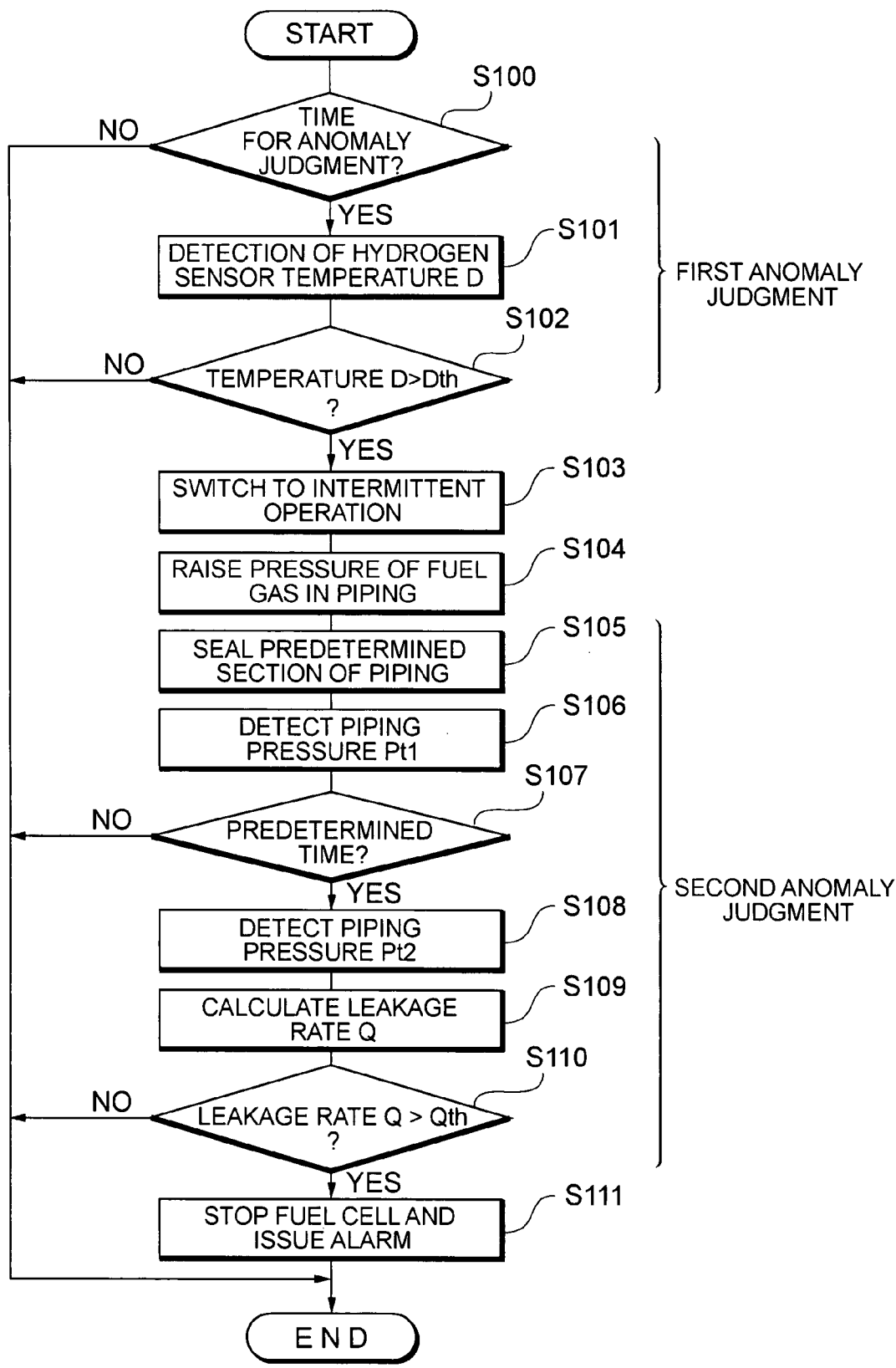
FIG. 4 is a flowchart illustrating an anomaly judgment method of the first embodiment.

As shown in FIG. 4, the other control processing is continued until an anomaly judgment processing execution time is reached (S100: NO). When the anomaly judgment processing execution time is reached (S100: YES), the detection signal Sd from the hydrogen sensor HD is first referenced and the hydrogen gas density is detected (S101). The control section 3 calculates the relative value of the real hydrogen gas density after referencing the detection signal Sd from the hydrogen sensor HD.

In cases where the detected hydrogen gas density D is equal to or less than a predetermined threshold value Dth (S102: NO), the first anomaly judgment processing is terminated without leakage of hydrogen gas outside the system. In this case, it is judged that there is no system anomaly. However, in cases where the hydrogen gas density D thus detected is greater than a predetermined threshold value Dth (S102: YES), the hydrogen gas density is abnormally high as far as examination of the detection signal Sd of the hydrogen sensor HD goes, that is, the possibility of an anomaly occurring is assumed, only when the detection signal Sd of the hydrogen sensor HD is examined.

The processing then moves on to the second anomaly judgment processing. Prior to the second anomaly judgment processing, the fuel cell system 200 is switched to an intermittent operation mode (S103). The intermittent operation mode is a mode that intermittently effects the operation of the fuel cell 100 at the required minimum at predetermined intervals. The fuel cell 100 alternates between periods of rest and periods of operation. In a rest period, an accessory such as a circulatory pump 18 is in a restful state. Thus, by switching to the intermittent operation mode, the accessory which is the cause of pressure fluctuations within the piping is stopped to enable a more accurate anomaly judgment.

Thereafter, the fuel gas in the piping can be forcibly raised as desired (S104). Hence, the pressure of the fuel gas piping 16 is raised by opening the shutoff valves G1 to G4 for fixed times, by supplying hydrogen gas of a predetermined pressure to the fuel gas piping 15 and fuel gas piping 16, and causing the circulatory pump 18 to operate for a fixed time, for example. It can be expected that a gas leak will be readily found as a result of implementing pressure increase processing in cases where the hydrogen gas pressure in the piping is low. This processing is optional and is an unnecessary step in cases where a piping pressure of a detectable level exists.

The processing then moves on to the second anomaly judgment processing.

First, the piping to be examined is sealed (S105). Here, because the pressure sensors are provided at respective points of the piping, the sealable points are all sealed. The shutoff valves G1 to G4 and L1 are shut off and a sealed section is formed between the fuel tanks 11 to 14 and the shutoff valve L1. Furthermore, the shutoff valve L1 and shutoff valve L3 are shut off and a circulatory route that is divided by the purge shutoff valve L3 via the fuel cell 100 from the shutoff valve L1 is a sealed section.

Further, pressure Pt1 at t1 directly after sealing is detected by means of a pressure sensor that is capable of examining the pressures of the respective sealed sections (S106). For example, in the case of the sealed section between the fuel tanks 11 to 14 and the shutoff valve L1, the pressure of the section is detected based on the respective detection signals of the pressure sensors p1 to p4, p10 and p11. In the case of the sealed section of the circulatory route, the pressure of the circulatory route is detected based on the detection signal of the pressure sensor p12.

Further, as a result of waiting until a predetermined time t2 has elapsed (S107; NO), the piping pressure Pt2 after the time t2 has elapsed (YES) is detected once again by the same pressure sensor (S108). There is a tendency for the flow rate of the piping to be proportional to the square root of the pressure change. Therefore, the difference between the detected pressure Pt1 and Pt2 is calculated and the flow rate Q from time t1 to t2 is determined (S109).

If hydrogen gas is not leaked, the pressure change is substantially zero and, therefore, the flow rate Q is also zero. However, if a hydrogen gas leak is occurred, the pressure drops in accordance with the flow output of the hydrogen gas and, as a result, the calculated flow rate Q also increases. Therefore, the calculated flow rate Q is compared with the threshold value Qth with which a clear hydrogen gas leak can be assumed (S110). If, as a result of the comparison, the calculated flow rate Q is equal to or less than the predetermined threshold value Qth (S110: NO), it is judged that there is no hydrogen gas leak. That is, because hydrogen gas remains at localized points at the time of the first anomaly judgment processing, the hydrogen gas only reaches a high density temporarily and it can be judged that there is no system anomaly. Therefore, in such a case, measures for stopping the system or other measures are not taken.

However, if the flow rate Q thus calculated is larger than the predetermined threshold value Qth (S110: YES), it is assumed that there is a hydrogen gas leak of a certain magnitude. Thus, when such a judgment is made, processing for a system anomaly is performed (S111). In other words, a measure to close the shutoff valve in order to completely stop the operation of the fuel cell 100 is taken or the supply of hydrogen gas or air is stopped, the load is detached and so forth.

According to the first embodiment hereinabove, in cases where it is judged that the hydrogen gas density is highly abnormal in the first anomaly judgment, the second anomaly judgment is started and, in cases where the pressure change in the sealed piping is large and a gas leak is assumed, a system anomaly is first judged. Therefore, in cases where a quite localized hydrogen gas accumulation, even when an anomaly is judged in the first anomaly judgment, because the pressure drop in the piping occurs abnormally, an anomaly is not judged in the second anomaly judgment and an erroneous judgment can be prevented. Further, in cases where a gas leak from the piping actually occurs and an external fuel gas concentration is produced abnormally, because an abnormal pressure drop in the fuel gas piping also occurs, a gas leak judgment is correctly made.

Further, according to the first embodiment, the first anomaly judgment involves the detection of the density of the hydrogen gas using hydrogen sensor HD whereas the second anomaly judgment involves the detection of pressure using a pressure sensor. The detection principles of the first and second anomaly judgments are also different. Hence, even when there is a malfunction with some of the detection-related constituent elements, the final judgment is not an erroneous judgment.

In addition, according to the first embodiment, in cases where the pressure of the hydrogen gas at the time of the first anomaly judgment is relatively low, because the second anomaly judgment is performed after the pressure has risen, the pressure (change) state can be more accurately judged.

Second Embodiment

Figure 3:
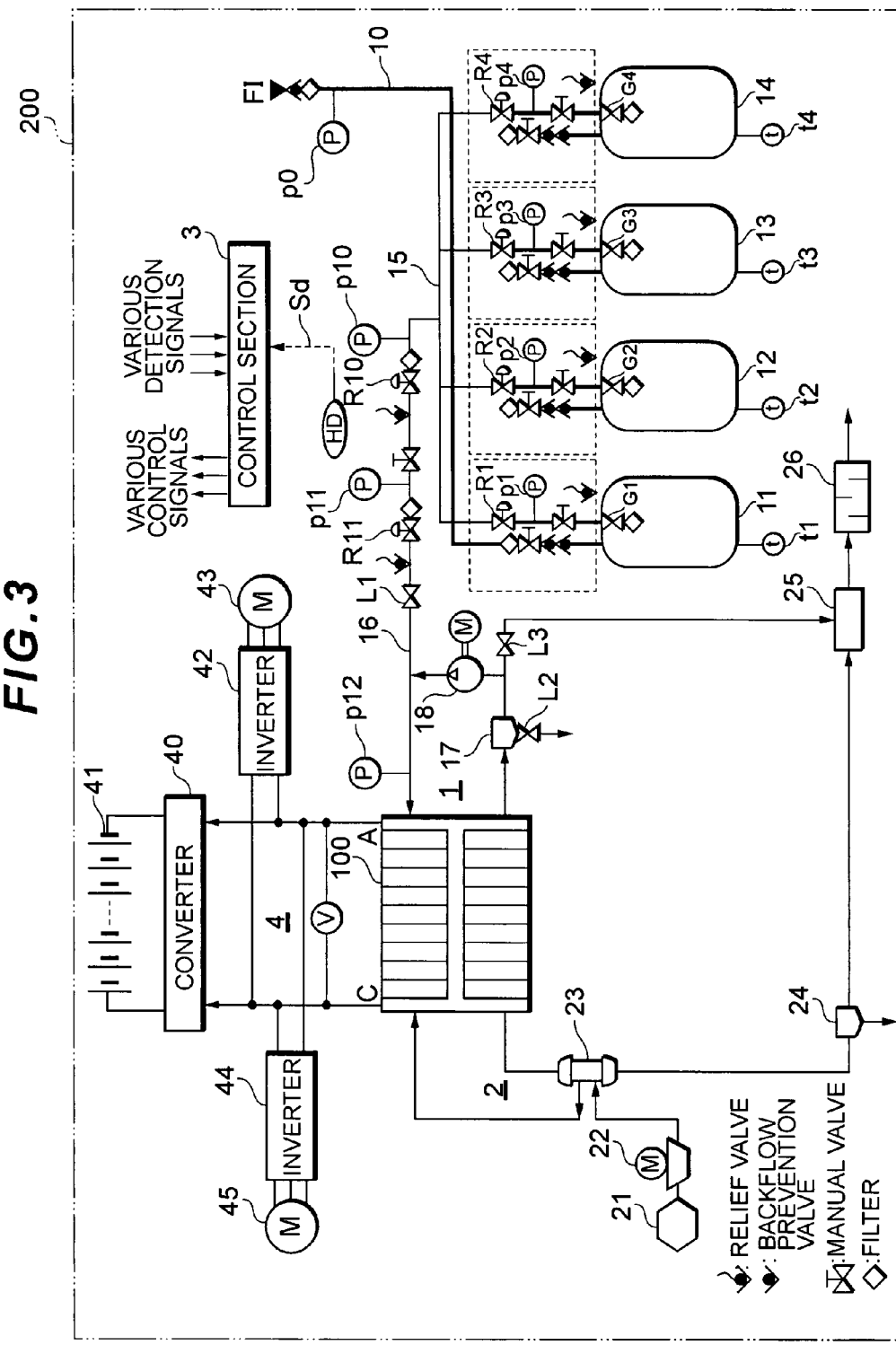
FIG. 3 is a system block diagram of a fuel cell system of a first embodiment.

The second embodiment of the present invention relates, in particular, to a constitutional example of an anomaly judgment device where the first anomaly judgment and second anomaly judgment are both performed based on pressure with different judgment procedures. The system constitution of this embodiment is the same as that of the system block diagram of the first embodiment shown in FIG. 3 and, therefore, a description of this system constitution is omitted. However, in this embodiment, the hydrogen sensor HD is not used.

Figure 5:
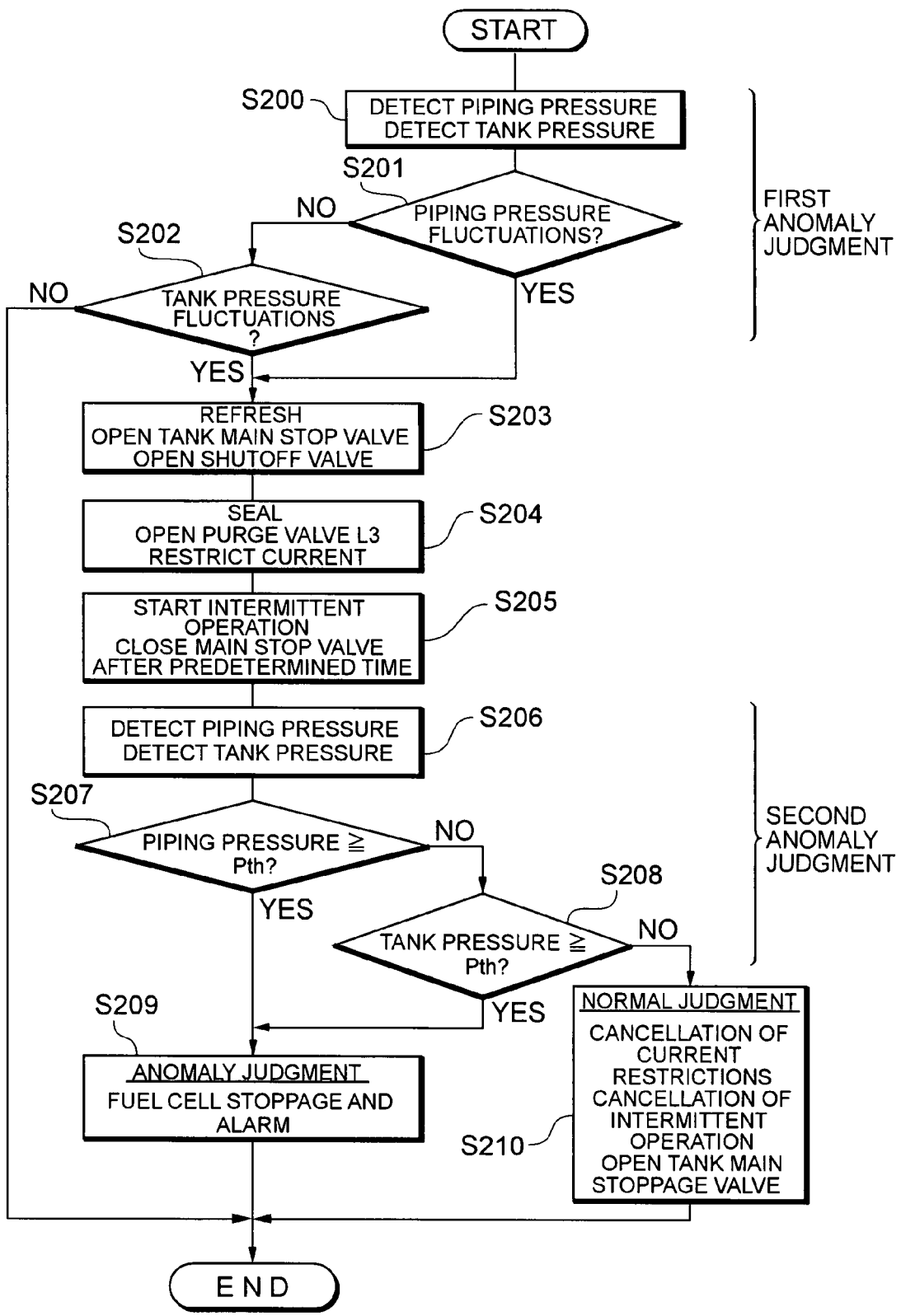
FIG. 5 is a flowchart illustrating an anomaly judgment method of a second embodiment.

The anomaly judgment method of the second embodiment will now be described with reference to the flowchart in FIG. 5. This flowchart is implemented at regular intervals during the operation of the fuel cell system 200.

The anomaly judgment device according to the second embodiment executes first anomaly judgment processing (means and device) (S200 to S201) that seals the pressure of the fuel gas piping 15 and 16 by means of shutoff valves G1 to G4 and L1 to L3, detects the pressure of the sealed fuel gas piping by means of pressure sensors p1 to p4 and p10 to p12 and judges that there is an anomaly in cases where the pressure change in the sealed fuel gas piping is equal to or more than a predetermined value, second abnormal judgment processing (means and device) (S204 to S206) that changes the power generation state of the fuel cell system 200 by means of power generation control means such as the various shutoff valves G1 to G4 and L1 to L3 and the accessories (18, 22) and judges that there is an anomaly in cases where the pressure of the fuel gas piping 15 and 16 when the power generation amount is restricted is equal to or less than a predetermined value; and judgment processing (means and device) (S207) that activates a second abnormal judgment in cases where it is judged by the first anomaly judgment that there is an anomaly.

In addition, processing (S202 to S203) that causes constituent elements of the system which pertain to the anomaly judgment to operate again after an anomaly is judged by means of the first anomaly judgment processing and before an anomaly judgment by the second anomaly judgment processing. This processing will be specifically described hereinbelow.

First, in order to perform the first anomaly judgment, the detection signals from the pressure sensors p1 to p4 are referenced and the relative values for the pressure of the respective fuel tanks 11 to 14 are obtained, and the detection signals from the pressure sensors p10 to p12 are referenced and the internal relative values of the fuel gas piping 15 and 16 are obtained (S200). The control section 3 calculates the relative values of the real hydrogen gas pressure after referencing the detection signal Sd from the respective pressure sensors. The average value of the pressure values detected from each of the fuel tanks 11 to 14 is calculated for the fuel tanks 11 to 14.

During a normal operation, the fuel gas piping 15 and 16 are held at a fixed hydrogen gas pressure through the action of regulator valves or the like. If a gas leak from any of the fuel gas piping occurs, the hydrogen gas pressure should drop from the normal pressure. Further, the flow rate from the fuel tanks must be of a magnitude at which an overcurrent is not generated. Therefore, the hydrogen gas pressure thus detected for the fuel gas piping 15 and 16 is compared to determine whether same has changed by a fixed threshold value or more from the previously detected pressure or a standard pressure that is preset (S201). For the fuel tanks 11 to 14, the average value of the detected hydrogen gas pressures of the respective fuel tanks is compared to determine whether the average value has not fluctuated to exceed a threshold value that is judged to represent an overcurrent (S202).

In cases where fluctuation equal to or more than the fixed value is observed for the detected hydrogen gas pressure (S201: YES), because the possibility of a hydrogen gas leak is assumed, the processing moves to the next step. If the detected hydrogen gas pressure P has not fluctuated (S201: NO), there is no leak of hydrogen gas from the fuel gas piping and the detected internal pressure of the fuel tank and the previous detected pressure or preset standard pressure are compared (S202). If the detected internal pressure of the fuel tank has not fluctuated to a level representing an overcurrent (S202: NO) and it is also assumed that there is no hydrogen gas leak from the fuel tank, whereupon the first anomaly judgment processing is terminated. The system anomaly is judged as being non-existent. However, in cases where fluctuation equal to or more than the fixed value is observed in the detected fuel tank internal pressure (S202: YES), an overcurrent of the fuel tanks 11 to 14 is doubted and the processing moves on to the second anomaly judgment processing Prior to the second anomaly judgment processing, a refresh operation (another operation) is carried out (S203). An incomplete operation such as when the shutoff valve to which a high pressure is applied does not completely close rarely occurs. An incomplete operation is not a fundamental failure and may be avoided by supply a repeat drive signal (open valve signal or close valve signal). The refresh operation temporarily supplies an open valve signal or close valve signal to the shutoff valve or supplies repetition, which removes such a temporary cause. Here, for example, an open valve signal is supplied to the shutoff valves G1 to G4 which are the main stop valves of the fuel tank or an open valve signal is supplied to the shutoff valves.

Thereafter, seal processing is performed (S204). In order to make the second anomaly judgment, the fuel gas piping 15 and 16 are sealed. Here, the purge shutoff valve L3 which is a path to the outside air closes. In addition, current restrictions for the fuel cell 100 are effected. Because there is a certain possibility of an anomaly when the processing moves to the second anomaly judgment, it is inevitable that the operation be restricted if necessary in order to make a more accurate judgment. Therefore, the power system 4 is controlled to free the load and restrict the output current.

The processing moves to the intermittent operating mode at the same time (S205). The intermittent operating mode is a mode in which the minimum required operation of the fuel cell 100 is effected intermittently at predetermined intervals. The fuel cell 100 alternates between periods of rest and periods of operation. In a rest period, an accessory such as a circulatory pump 18 is in a restful state. Thus, by switching to the intermittent operation mode, the accessory which is the cause of pressure fluctuations within the piping is stopped to enable a more accurate anomaly judgment. The intermittent operation is started and the shutoff valves G1 to G4 which are the main stop valves are closed once a predetermined time has elapsed. The supply of hydrogen gas is stopped so that the hydrogen gas in the fuel gas piping is consumed and an enclosed region is formed.

Thereafter, the processing moves to the second anomaly judgment processing.

As per the previous processing (S200), the hydrogen gas pressure in the fuel gas piping and fuel tanks is detected on the basis of the detection signals from the pressure sensors (S206). Preferably, pressure sensors that are different from the pressure sensors utilized in the first anomaly judgment are used. This is because erroneous detection is prevented by switching the sensors utilized in the second anomaly judgment in cases where the pressure sensors utilized in the first anomaly judgment have judged that there is an anomaly because a malfunction has been generated. Further, this time the absolute value for the pressure is ascertained rather than judging the fluctuation (rate of change) of the hydrogen gas. In other words, the second anomaly judgment processing is the same as the first anomaly judgment processing in that pressure is detected but the judgment procedure differs in that the absolute value in the sealed fuel gas piping is judged.

In cases where the detected hydrogen gas pressure in the fuel gas piping is equal to or more than a predetermined threshold value Pth (S207: YES), the possibility that hydrogen gas will leak from the fuel gas piping is high and, therefore, an anomaly is judged (S209). On the other hand, in cases where the detected hydrogen gas pressure in the fuel gas piping is less than the threshold value Pth, the fuel tank internal pressure is examined further (S208). In a case where the detected fuel tank internal pressure is also smaller than the threshold value Pth (S208: NO), it can be judged that there is not leak of hydrogen gas from the fuel tank or from the fuel gas piping. Hence, it is judged that the system is normal and the current restrictions (S204) and intermittent operation (S205) are released, meaning that the shutoff valves G1 to G4 which are the main stop valves are opened and a normal operation follows (S210). However, in cases where the detected fuel tank internal pressure is equal to or less than the threshold value Pth (S208: YES), because the possibility of a hydrogen gas leak from any of the fuel tanks 11 to 14 is high, an anomaly is judged to exist (S209).

In the anomaly judgment (S209), because the operation of the fuel cell system 200 is stopped, the shutoff state of the respective shutoff valves and the stoppage of the accessories are continued and the connection of the power system 4 is also cancelled. Further, an alarm in the form of an image, light, or sound is issued if necessary.

According to the second embodiment, once it is judged in the first anomaly judgment that there is an anomaly due to a drop in the pressure of the fuel gas piping 15 and 16 and the fuel tanks 11 to 14, the second anomaly judgment is carried out and the pressure in a state where the power generation amount is restricted is monitored. If the pressure is abnormal, a system anomaly is first judged to exist. Hence, even when it is judged that there is an anomaly in the first abnormal judgment as a result of pressure fluctuations produced as a result of the operation of the accessories of the fuel cell 100, the absolute pressure is judged in a state where the cause of the pressure fluctuations is excluded by means of the second anomaly judgment, whereby an erroneous judgment can be prevented. In cases where a drop in pressure is observed as a result of a gas leak from the fuel gas piping, because this represents a state where the pressure in a state where the power generation amount is restricted has dropped abnormally, a system anomaly is correctly judged in this case.

According to the second embodiment, in cases where one anomaly has been judged in the first anomaly judgment, because the constituent element (shutoff valve) related to such an anomaly judgment is refreshed, the operation of this constituent element is restored to normal in the second anomaly judgment and an erroneous judgment that there is a system anomaly can be prevented.

Third Embodiment

The third embodiment of the present invention relates to an example where the constitution of the fuel cell system 200 is slightly different.

Figure 6:
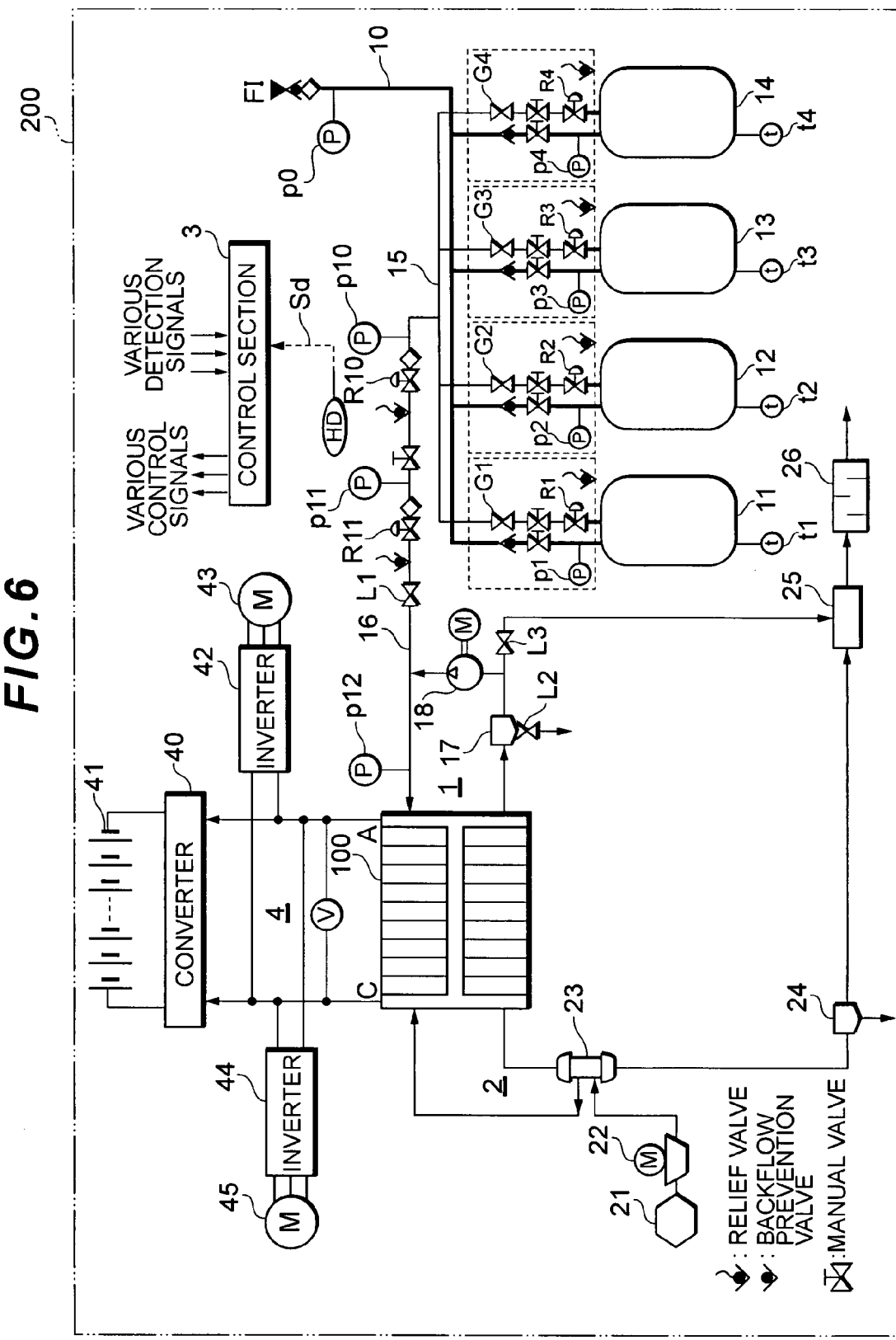
FIG. 6 is a system block diagram of a fuel cell system of a third embodiment.

FIG. 6 shows a system block diagram of the fuel cell system 200 relating to the third embodiment.

The fuel cell system 200 shown in FIG. 6 is the same as the constitution of the first embodiment except for the fact that the constitution of the valve provided in the inlet and outlet systems of the fuel tanks 11 to 14 differs.

The piping that flows from the fuel charging piping 10 to each of the fuel tanks 11 to 14 is provided with a backflow prevention valve, a manual valve, and pressure sensors p1 to p4. Because a shutoff valve is not provided between the pressure sensors and fuel tanks, the pressure sensors p1 to p4 are constituted to always enable detection of the internal pressure of the fuel tanks.

The piping from the respective fuel tanks 11 to 14 to the fuel gas piping 15 is provided with regulator valves R1 to R4, a manual valve, and shutoff valves G1 to G4. The shutoff valves G1 to G4 are constituted so that each permits open and close control by the control section 3 and so that, when open, hydrogen gas is supplied to the fuel gas piping 15. The regulator valves R1 to R4 are constituted so that high-pressure hydrogen gas in the fuel tanks is supplied reduced in pressure to a fixed secondary pressure (intermediate pressure).

In cases where the anomaly judgment method of the present invention is implemented with the above constitution, it can be carried out by means of substantially the same procedure as that of the above embodiment. However, the pressure sensors p1 to p4 are able to detect the internal pressure of the fuel tank even when the shutoff valves G1 to G4 which are the main stop valves are not open. Hence, for example, the processing whereby the main stop valves of the tanks are opened in step S203 and the main stop valves of the tanks are closed in step S205 in the flowchart in FIG. 5 is unnecessary for the purpose of sensing the fuel tank internal pressure by means of pressure sensors.

The present invention can be applied by modifying the valve constitution and piping structure and so forth in a variety of ways as shown in this embodiment.

Fourth Embodiment

The fourth embodiment of the present invention relates to an example in which hydrogen gas pressure detection and flow rate detection are used, which constitutes an example in which the detection principles of the detection devices differ.

Figure 7:
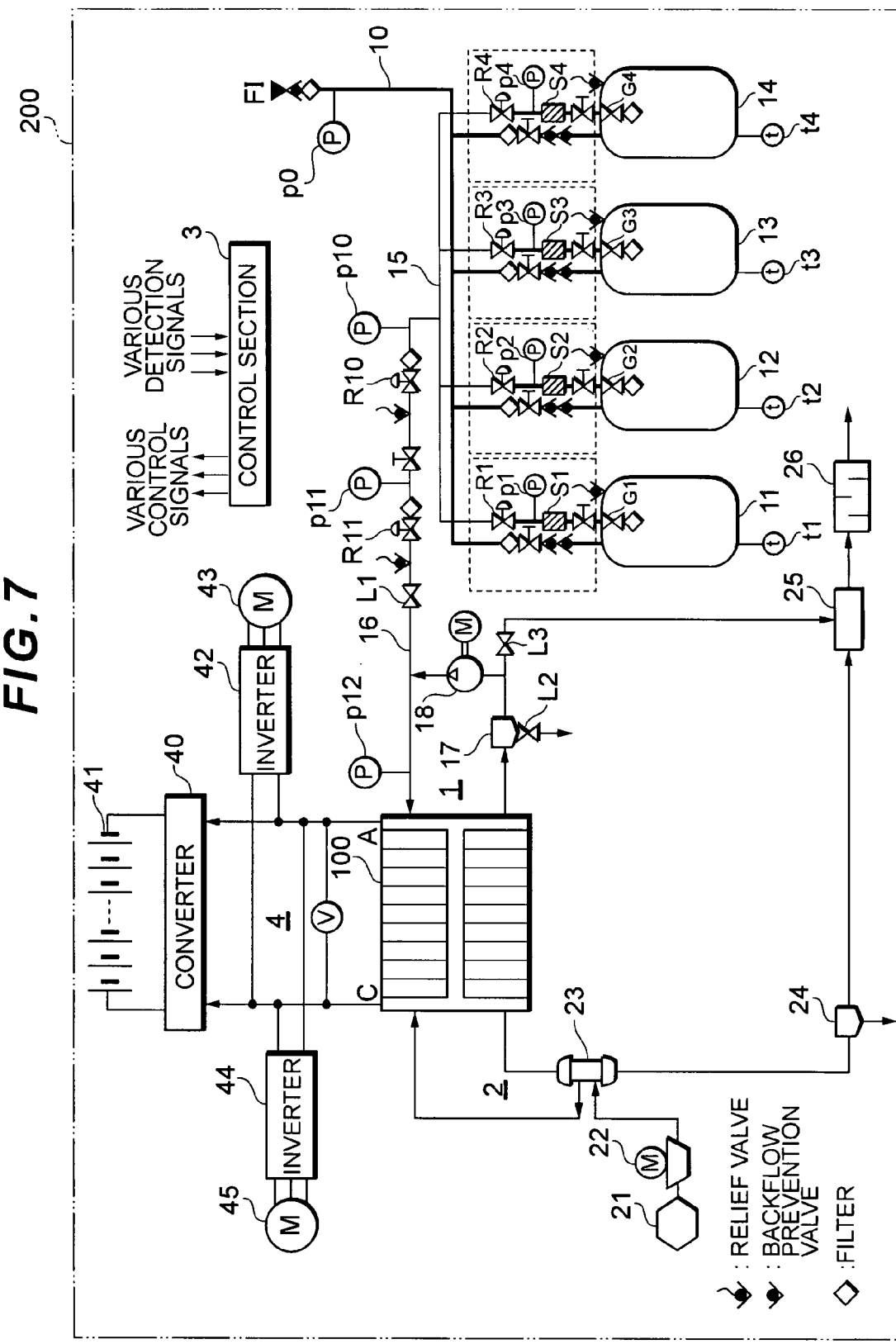
FIG. 7 is a system block diagram of a fuel cell system of a fourth embodiment.

FIG. 7 shows a system block diagram of the fuel cell system 200 according to the fourth embodiment.

The fuel cell system 200 shown in FIG. 7 is basically substantially the same as the fuel cell system (FIG. 3) of the first embodiment. However, the fuel cell system 200 of the fourth embodiment differs in that, the outlet piping of the fuel tanks 11 to 14 comprises flow rate sensors S1 to S4 between the shutoff valves G1 to G4 and the regulator valves R1 to R4. Further, because the hydrogen gas density detection is not effected, the hydrogen sensor HD is not provided.

Figure 8:
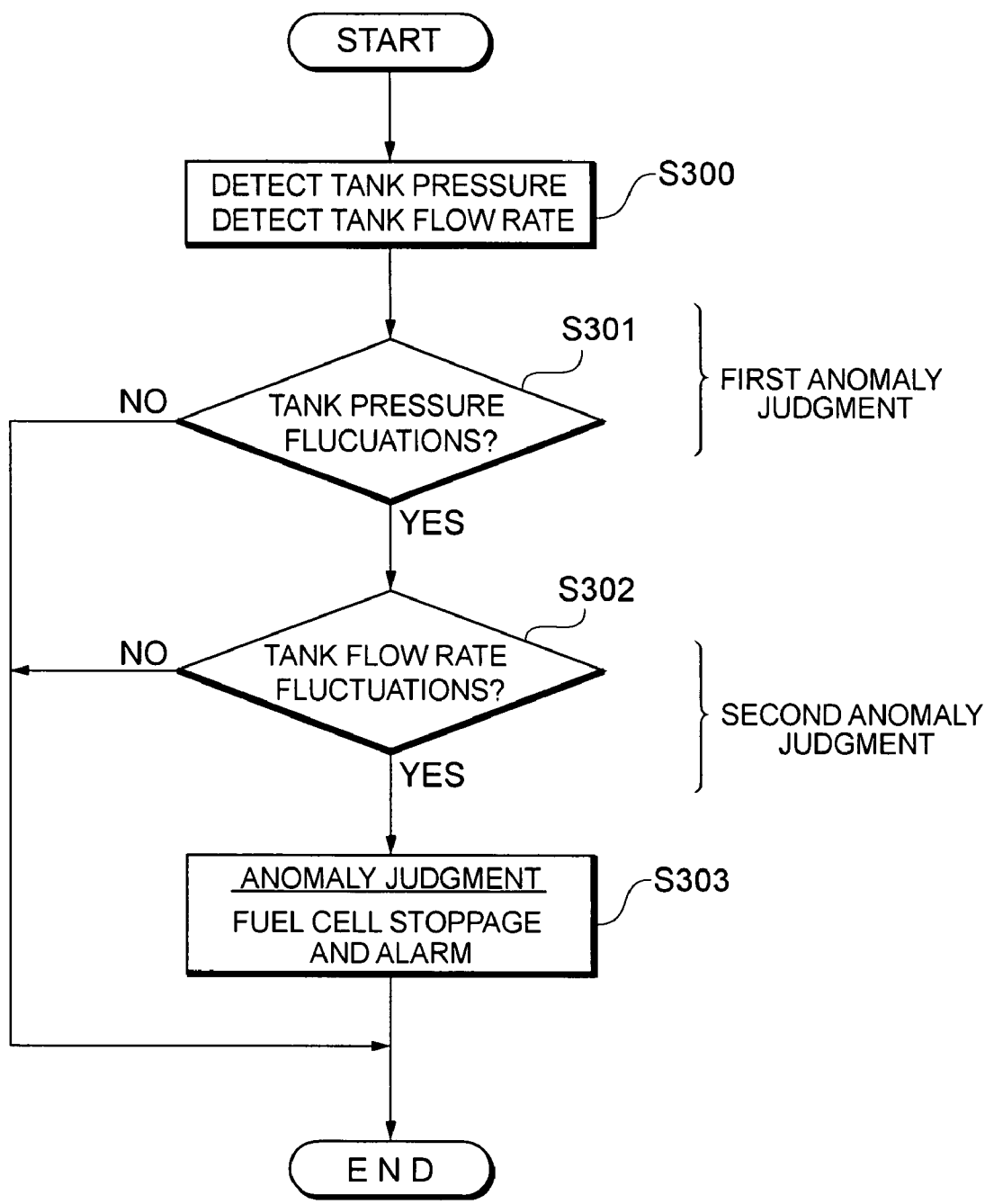
FIG. 8 is a flowchart illustrating an anomaly judgment method of the fourth embodiment.

The anomaly judgment method of the fourth embodiment will be described next with reference to the flowchart in FIG. 8. The flowchart is implemented at regular intervals during the operation of the fuel cell system 200.

The anomaly judgment device of the fourth embodiment detects fluctuations in the internal pressure of the fuel tanks 11 to 14 in the first anomaly judgment and, in cases where internal pressure fluctuations are detected, the hydrogen gas flow rate detection by the flow rate sensors S1 to S4 is performed and a system anomaly is judged in cases where there are fluctuations in the flow rate.

First, the detections signals from the pressure sensors p1 to p4 are referenced and the pressure relative values of the respective fuel tanks 11 to 14 is acquired. The detection signals from the flow rate sensors S1 to S4 are referenced and the relative values of the flow rate of hydrogen gas supplied from the respective fuel tanks 11 to 14 to the fuel gas piping 15 are acquired (S300). With respect to the pressure, the average value of the pressure values detected from each of the fuel tanks 11 to 14 is then calculated. The average value of the flow rate values detected for each of the fuel tanks 11 to 14 is also calculated for the flow rate.

During a normal operation, the hydrogen gas internal pressure of the fuel tanks 11 to 14 and the hydrogen gas flow rate from the fuel tanks 11 to 14 is held substantially fixed as a result of the action of the regulator valves and so forth. If a regulator valve defect occurs or there is a problem with the fuel tanks, there should be pressure fluctuations in comparison with the normal pressure. In addition, the flow rate from the fuel tank must be of a magnitude where an overcurrent is not produced. Therefore, a check that there are no fluctuations exceeding a threshold value at which the average value of the hydrogen gas pressures of the detected respective fuel tanks is judged to be an overcurrent is performed (S301). That is, the average value for the detected fuel tank internal pressure is compared with the previous detection pressure or a preset standard pressure. As a result, if there are no fluctuations to the extent where the fuel tank internal pressure thus detected results in an overcurrent (S301: NO), there is no leakage of hydrogen gas from the fuel tanks and the first anomaly judgment processing is terminated. In this case, it is judged that a system anomaly does not exist.

However, in cases where fluctuations of a fixed amount or more are observed in the detected fuel tank internal pressure (S201: YES), an overcurrent of the fuel tanks 11 to 14 is doubtful. Hence, the processing moves to the second anomaly judgment. As the second anomaly judgment processing, the flow rate of the hydrogen gas is judged this time. In cases where the average value of the hydrogen gas flow rate thus detected fluctuates at or above a predetermined threshold value, it is examined whether the fluctuations are at or above a fixed value in comparison with the previous flow rates (S302). The pressure variations and flow rate changes are subject to a strict relationship. Suppose a change in the pressure measured in substantially the same position in the piping is produced, there should then also be a variation in the flow rate. Further, supposing that there is a change in the flow rate, fluctuations in the pressure should also be produced. Therefore, once pressure fluctuations have been detected in the first anomaly judgment and it is estimated that there is an anomaly, an examination of whether there no fluctuations in the flow rate is then immediately performed.

In cases where fluctuations are not produced in the average value of the hydrogen gas flow rate (S302: NO), the occurrence of fluctuations in the pressure that is strictly related to the flow rate makes it possible to estimate that there is a pressure sensor malfunction. Hence, a system anomaly is not judged.

However, in cases where there are also fluctuations in the average value of the hydrogen gas flow rate (S302: YES), it is thought that a gas leak from the fuel gas piping 15 or 16 or fuel tanks 11 to 14 or a malfunctioning of the respective valves is the cause of these fluctuations. This is because this is a defect that affects the operation of the fuel cell system 200 and a system anomaly is judged to exist (S303). Further, because the operation of the fuel cell system 200 is stopped, the shutting of the respective shutoff valves and the stoppage of the accessories is continued and the connection of the power system 4 is also cancelled. Further, an alarm in the form of an image, light, or sound is emitted if necessary.

According to the fourth embodiment hereinabove, if it is judged from the pressure fluctuations of the fuel tanks 11 to 14 that there is an anomaly in the first anomaly judgment, the second anomaly judgment is accordingly performed and, when flow rate fluctuations are observed and the flow rate is abnormal, a system anomaly is first judged to exist. An erroneous judgment can be prevented even when there is a malfunctioning of any of the detection devices by using a different sensor and different method to detect the inextricably linked system state.

According to the fourth embodiment in particular, because a final judgment of whether there is a system anomaly is performed after performing judgments of two physical quantities which are detected using different detection principles in the same system operating state (a state where hydrogen gas is flowing in this embodiment), it is not necessary to increase the procedure for examination or to temporarily switch to an intermittent operation for the examination.

MODIFIED EXAMPLE

The present invention is not limited to the above embodiment and can be applied by making a variety of modifications.

For example, although a combination of hydrogen gas density and pressure, a combination of pressure fluctuations and pressure absolute values, and a combination of pressure fluctuations and flow rate fluctuations were exemplified in this embodiment, the present invention is not limited to such combinations. A plurality of detection devices and judgment means can be combined in a variety of ways.

The anomaly judgment device (method) of the present invention is not only a moving body such as a vehicle, ship, or aircraft in which the fuel cell system 200 is mounted. The present invention can also be applied to a fuel cell system 200 that is installed in an enclosed region such as a building or house.

INDUSTRIAL APPLICABILITY

According to the present invention, because there is no system anomaly until an abnormal judgment has been made by another anomaly judgment means when an abnormal judgment has been made by one anomaly judgment means, even when there is a localized abnormal state judgment or failure of one anomaly judgment means, a final judgment is not made based on this anomaly alone and confirmation work by means of a further anomaly judgment is implemented, whereby a highly accurate anomaly judgment without an erroneous judgment is possible.

Accordingly, the present invention can be widely applied to anomaly judgment devices with such requirements.

We claim:

1. An anomaly judgment device of a fuel cell system, comprising:
    a first anomaly judgment device to judge a gas leak of the system that includes a first judgment device that judges whether there is an anomaly in cases where a fuel gas density detected by a detection device is equal to or more than a predetermined value;
    a second anomaly judgment device to judge a gas leak of the system that includes a second judgment device that judges that there is an anomaly in cases where the change in pressure in fuel gas piping sealed by a sealing device is equal to or more than a predetermined value; and
    a judgment device to implement an anomaly judgment using the second anomaly judgment device in cases where it is judged by the first anomaly judgment device that there is an anomaly and to judge that a system anomaly exists in cases where it is also judged by the second anomaly judgment device that there is an anomaly, and
    wherein the judgment device activates the second anomaly judgment device in cases where it is judged by the first judgment device that there is an anomaly.

2. The anomaly judgment device of the fuel cell system according to claim 1,
    wherein the detection device that detects the fuel gas density is located outside the fuel cell system.

3. The anomaly judgment device of the fuel cell system according to claim 1, wherein constituent elements of the system pertaining to the gas leak judgment are caused to operate once again after it is judged by the first anomaly judgment device that there is a gas leak and prior to the gas leak judgment by the second anomaly judgment device.

4. The anomaly judgment device of the fuel cell system according to claim 1, wherein the judgment device stops the fuel cell system in cases where it is judged by the second anomaly judgment device that there is a gas leak.

5. An anomaly judgment device of a fuel cell system, comprising:

a first anomaly judgment device to judge a gas leak of the system that includes a first judgment device that judges whether there is an anomaly in cases where a fuel gas density detected by a detection device is equal to or more than a predetermined value;

a second anomaly judgment device to judge a gas leak of the system that includes a second judgment device that judges that there is an anomaly in cases where the change in the pressure in fuel gas piping sealed by a sealing device is equal to or more than a predetermined value;

a judgment device to implement an anomaly judgment using the second anomaly judgment device in cases where it is judged by the first anomaly judgment device that there is an anomaly and to judge that a system anomaly exists in cases where it is also judged by the second anomaly judgment device that there is an anomaly; and a device to raise the pressure of the fuel gas in the fuel gas piping, during intermittent operation of the fuel cell, and after it is judged by the first anomaly judgment means that there is a gas leak and prior to the gas leak judgment by the second anomaly judgment, wherein the judgment device activates the second anomaly judgment device in cases where it is judged by the first judgment device that there is an anomaly.

6. The anomaly judgment device of the fuel cell system according to claim 5, wherein the judgment device stops the fuel cell system in cases where it is judged by the second anomaly judgment device that there is a gas leak.

* * * * *

UNITED STATES PATENT AND TRADEMARK OFFICE
CERTIFICATE OF CORRECTION

| | | |
|---|---|---|
| PATENT NO. | : 7,882,728 B2 | Page 1 of 1 |
| APPLICATION NO. | : 11/920350 | |
| DATED | : February 8, 2011 | |
| INVENTOR(S) | : Mikio Kizaki et al. | |

It is certified that error appears in the above-identified patent and that said Letters Patent is hereby corrected as shown below:

| Column | Line | |
|---|---|---|
| 5 | 33 | Change "110, 120, ..., n0" to --110, 120, ...,1n0--. |

Signed and Sealed this
Thirty-first Day of May, 2011

David J. Kappos
*Director of the United States Patent and Trademark Office*